(12) United States Patent
Hotta (10) Patent No.: US 6,328,485 B1
(45) Date of Patent: Dec. 11, 2001

(54) OPTICAL MODULE AND METHOD FOR MANUFACTURING SAME

(75) Inventor: Hajime Hotta, Tokyo (JP)

(73) Assignee: Oki Electric, Industry, Co., Ltd. (JP)

( * ) Notice: Subject to any disclaimer, the term of this patent is extended or adjusted under 35 U.S.C. 154(b) by 0 days.

(21) Appl. No.: 09/702,732

(22) Filed: Nov. 1, 2000

(30) Foreign Application Priority Data

Jun. 13, 2000 (JP) .................................................. 12-176271

(51) Int. Cl.[7] ...................................................... G02B 6/36
(52) U.S. Cl. .............................................................. 385/94
(58) Field of Search ........................... 385/80–88, 92–95; 257/432, 433, 93, 99, 98; 219/633; 156/272.2, 273.3, 275.3, 290

(56) References Cited

U.S. PATENT DOCUMENTS

| | | | | |
|---|---|---|---|---|
| 5,936,263 | * | 8/1999 | Hashizume | ............................... 257/98 |
| 6,141,471 | * | 10/2000 | Aatsuma | ................................. 385/49 |
| 6,157,012 | * | 12/2000 | Tanaka et al. | ......................... 219/633 |

* cited by examiner

*Primary Examiner*—Akm E. Ullah
(74) *Attorney, Agent, or Firm*—Venable; James R. Burdett

(57) ABSTRACT

An optical module comprising: an optical semiconductor element, an optical fiber optically coupled to the optical semiconductor element, a substrate on which the optical semiconductor element and optical fiber are mounted, and a sealing section wherein the optical semiconductor element and the region of the optical fiber containing the end face thereof adjacent to the optical semiconductor element are covered by a sealant. A sealant retaining section is formed in the substrate. The sealing section has a dome shape formed by a single layer of sealant, and the end portions of this sealing section, apart from the side thereof adjacent to the optical fiber, are fixed by a sealant retaining section. According to this composition, the optical fiber, optical semiconductor element and the optical coupling section between the optical fiber and the optical semiconductor element are sealed satisfactorily.

4 Claims, 7 Drawing Sheets

OPTICAL MODULE AND METHOD FOR MANUFACTURING SAME

BACKGROUND OF THE INVENTION

1. Field of the Invention

The present invention relates to an optical module comprising an optical fiber and a light-emitting element and/or light-receiving element used in an optical data transmission device, and a method for manufacturing same.

2. Description of Related Art

Figure 6:
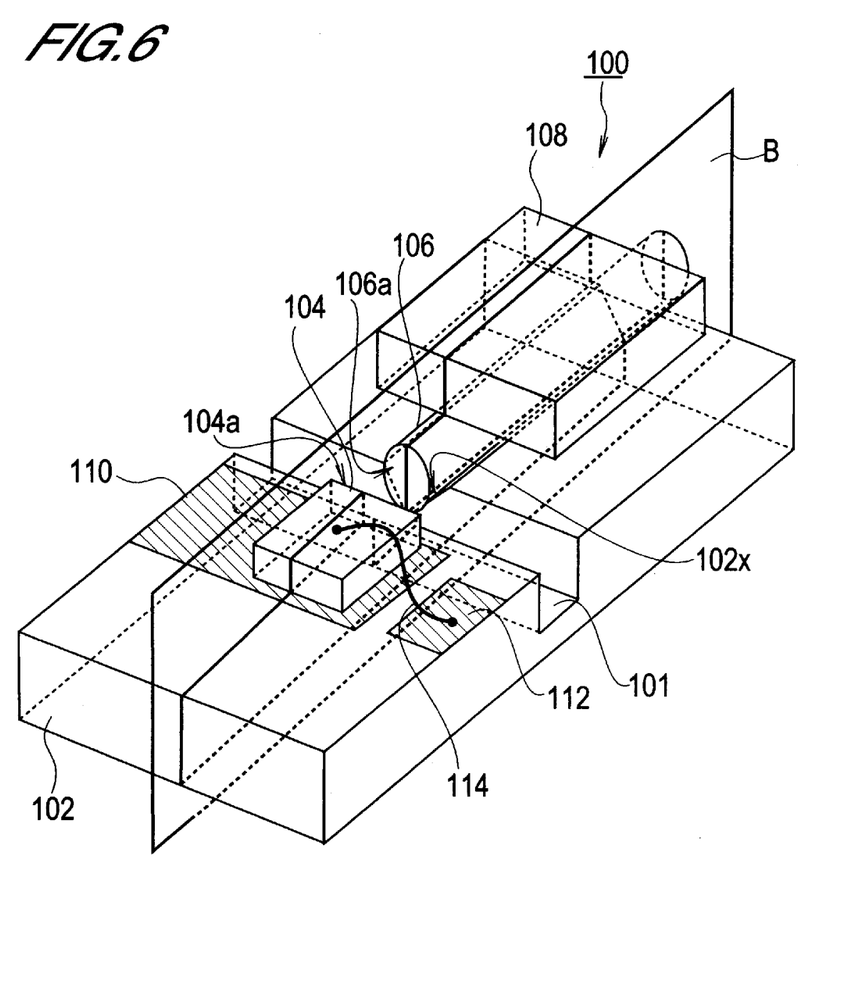
FIG. 6 is a schematic oblique view showing the composition of a conventional optical module.
Figure 7:
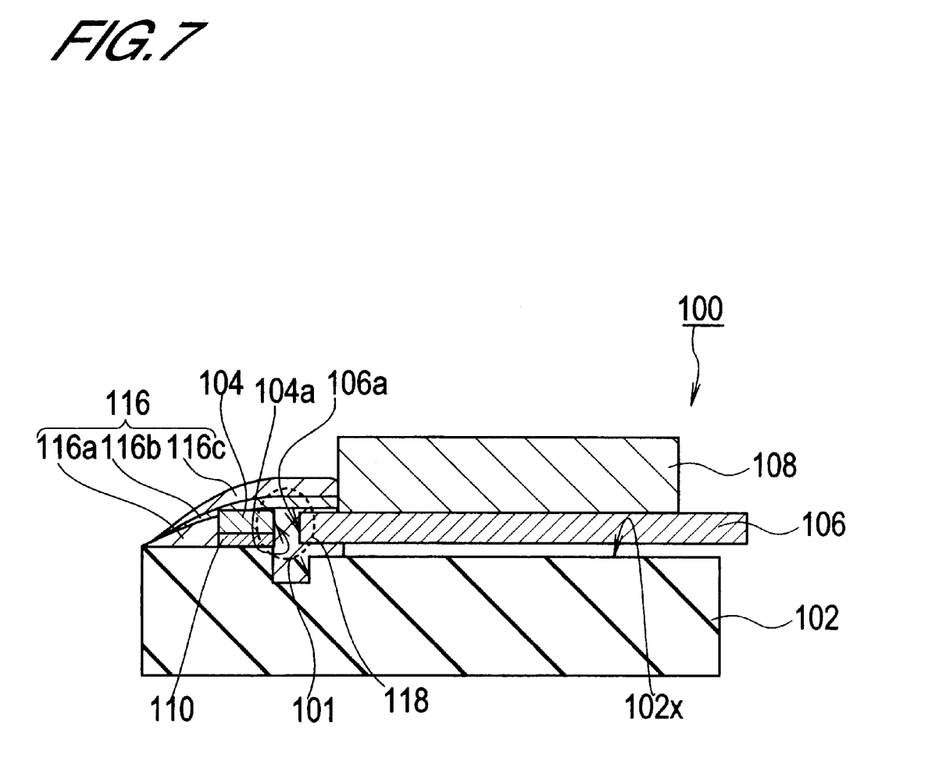
FIG. 7 is a schematic sectional view of a conventional optical module.

FIG. 6 and FIG. 7 give general views of one example of a conventional optical module comprising optical fibers, a light-emitting element and/or a light-receiving element. FIG. 6 is an oblique view of an optical module and FIG. 7 shows the structure of a section cut along plane B in FIG. 6.

An 'optical module' is a general term for an optical transmission module comprising an optical fiber and a light-emitting element, an optical reception module comprising an optical fiber and a light-receiving element, or an optical transmission and reception module comprising an optical fiber, light-emitting element and light-receiving element.

According to FIG. 6 and FIG. 7, the optical module 100 comprises an Si substrate 102, an optical semiconductor element 104 and an optical fiber 106. An LD chip forming the optical semiconductor element 104 is provided in a respective position on the upper face of the Si substrate 102.

A V-shaped groove 102x is formed on top of the Si substrate 102, and an optical fiber 106 is mounted in this V-shaped groove 102x in such a manner that it contacts both walls thereof. A fiber cover 108 is provided in such a fashion that it covers the optical fiber 106. The fiber cover 108 and Si substrate 102 are bonded by means of an ultraviolet-setting adhesive. Thereby, the optical fiber 106 is secured under pressure between the fiber cover 108 and the Si substrate 102. Moreover, an anode electrode 110 and a cathode electrode 112 are respectively provided in an electrically unconnected fashion on the upper face of the Si substrate 102, at distant positions from the light input face 106a of the optical fiber 106. These electrodes 110 and 112 are laminated films formed by successively layering Ti film, Pt film and Au film onto the Si substrate 102. Moreover, an LD chip 104 is fixed by Au/Sn soldering onto the anode electrode 110. A light output face 104a of the LD chip 104 opposes the light input face 106a of the optical fiber 106. The LD chip 104 and optical fiber 106 are respectively positioned with very high accuracy by means of a dicing half-cut 101 formed in the Si substrate 102, in such a manner that light output by the LD chip enters into the optical fiber 106. Moreover, the upper face of the LD chip 104 and the cathode electrode 112 are connected by means of wire bonding 114.

Furthermore, this optical module is sealed by means of a resin, in such a manner that the whole of the LD chip 104 and the portion of the optical fiber 106 on the light input face 106a side thereof are covered, as illustrated in FIG. 7. In FIG. 6, this resin is omitted from the drawing in order to describe the internal composition of the module 100. Hereinafter, the sealed portion of the module is called the sealing section 116. Moreover, the resin in the sealing section 116 is called 'potting resin', for which an Si resin, which is a thermosetting resin, is used.

The manufacture of an optical module 100 of this kind is performed as described below, for example. Firstly, a V-shaped groove 102x is formed by an etching process in the region of the Si substrate 102 where an optical fiber is to be installed. Thereupon, a Ti film, Pt film and Au film are layered in that order onto the upper face of the Si substrate 102, by means of sputtering. Consequently, a laminated film (Ti—Pt—Au film) is formed on the upper face of the Si substrate 102. Thereupon, the laminated film is patterned by means of photolithography and subsequent etching processes, in such a manner that it forms a cathode electrode-shaped and anode electrode-shaped pattern. Next, an optical axis direction positioning groove (called a 'dicing half cut') 101 for an LD chip and optical fiber is formed in the Si substrate 102. Thereupon, an LD chip 104 is located in position over the anode electrode-shaped pattern by a marker alignment process, whereupon it is fixed by means of Au/Sn solder. The upper face of the LD chip 104 and the cathode electrode-shaped pattern are connected by means of wire bonding 114. Thereby, the anode electrode-shaped pattern forms an anode electrode 110, and the cathode electrode-shaped pattern forms a cathode electrode 112. Next, the optical fiber 106 is mounted in the V-shaped groove 102x, whilst positioning same in the optical axis direction with respect to the LD chip by means of the dicing half-cut 101 provided in the substrate 102. Thereupon, a fiber cover 108 is provided in such a manner that it covers the optical fiber 106, and the fiber cover 108 and Si substrate 102 are bonded together by means of an ultraviolet-setting adhesive.

Next, an Si resin forming the potting resin is applied on in such a manner that it covers the whole of the LD chip 104 and the portion of the optical fiber 106 on the light input side 106a thereof. Next, the resin is hardened by heating the assembly in an oven at a temperature of 130–150° C. Thereby, a sealing section 116 is formed.

However, in the process of forming the aforementioned sealing section 116, during the hardening of the potting resin by means of the heating process, loosening of the resin may occur, due to physical causes such as decline in the viscosity of the resin below the viscosity immediately after the application thereof, or decline in the surface tension of the resin. Therefore, after heat treatment, the potting resin does not provide a satisfactory cover over the LD chip 104 and the optical coupling section 118 between the LD chip 104 and the optical fiber 106 (indicating the region between the light output face 104a of the LD 104 and the light input face 106a of the optical fiber 106). When the optical coupling section 118 is exposed to the external atmosphere, the constituent components of the elements are oxidized by oxygen in the air, for example, and there is a risk that this may cause degradation of device reliability. Moreover, in order to prevent this degradation of device reliability, in other words, in order to obtain a sealing section 116 of sufficient thickness, the potting resin coating process and heating processing must be repeated a number of times in order to form a sealing section 116 (116a, 116b, 116c) comprising a plurality of layers (FIG. 7).

SUMMARY OF THE INVENTION

Therefore, it is an object of the present invention to provide an optical module having high reliability of the sealing of the optical fiber front end portion, the sealing of the optical semiconductor element itself, and the sealing of the optical coupling section between the optical fiber and the optical semiconductor element. Moreover, it is a further object of the present invention to provide a method for manufacturing an optical module whereby an optical module having a highly reliable sealing section can be fabricated readily.

In order to achieve these objects, the optical module according to the present invention has a composition comprising the following characteristic features. Namely, the optical module according to the present invention comprises: an optical semiconductor element: an optical fiber coupled optically with the optical semiconductor element; a substrate whereon the optical semiconductor element and the optical fiber are mounted; and a sealing section wherein the optical semiconductor element and a portion of the optical fiber containing the end face thereof adjacent to the optical semiconductor element are covered by a sealant. In this invention, a sealant retaining section is formed on the upper face of the substrate and the sealing section has a dome shape constituted by a single layer of sealant. Moreover, in this invention, the end portions of the sealing section about the periphery of the optical semiconductor element, on the sides thereof which are not facing the optical fiber, are fixed by the sealant retaining section.

If a light-emitting element is used as the optical semiconductor element, then this light-emitting element and the optical fiber are positioned on the substrate in such a manner that the light emitting face of the light-emitting element and the light input face of the optical fiber are mutually opposing. Moreover, if the optical semiconductor element is a light-receiving element, then this light-receiving element and the optical fiber are positioned on the substrate in such a manner that the light receiving face of the light-receiving element and the light output face of the optical fiber are mutually opposing.

The optical module according to the present invention having the foregoing composition comprises a sealing section whereby the optical semiconductor element itself, and the optical coupling section between the optical semiconductor element and the optical fiber are covered sufficiently by a single layer of sealant. Consequently, there is no risk of the optical semiconductor element or the optical coupling section between the optical semiconductor element and the optical fiber being exposed to the external atmosphere, and hence it is possible to ensure the reliability of the module.

BRIEF DESCRIPTION OF THE DRAWINGS

The forgoing and other objects, features and advantages of the present invention will be better understood from the following description taken in connection with the accompanying drawings, in which.

DESCRIPTION OF THE PREFERRED EMBODIMENTS

Below, an embodiment of the present invention is described with reference to the drawings. Moreover, these drawings serve simply to give approximate illustrations of the shape, size and positional relationships of the respective constituent elements for the purpose of understanding the present invention, and therefore this invention is not limited to the illustrated examples. Furthermore, in the drawings, the hatching (diagonal lines) indicating a cross-section has been omitted in parts, in order to simplify the diagrams.

Figure 1:
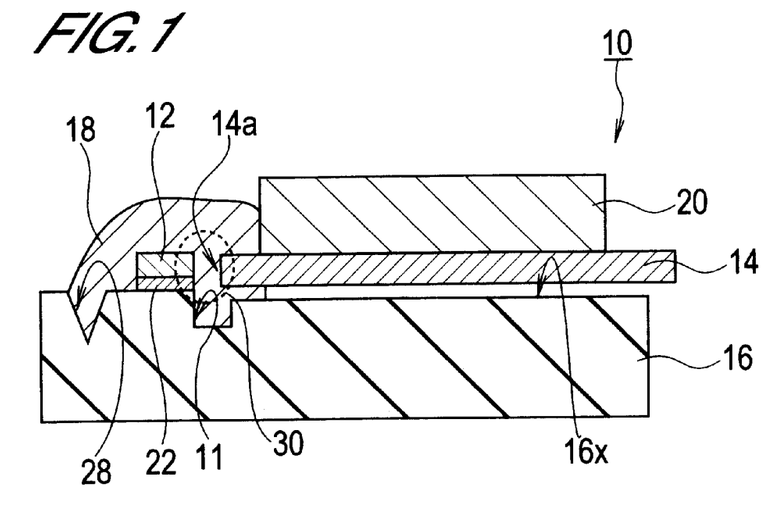
FIG. 1 is an approximate compositional diagram of an optical module according to an embodiment of the present invention, showing a sectional view.
Figure 2:
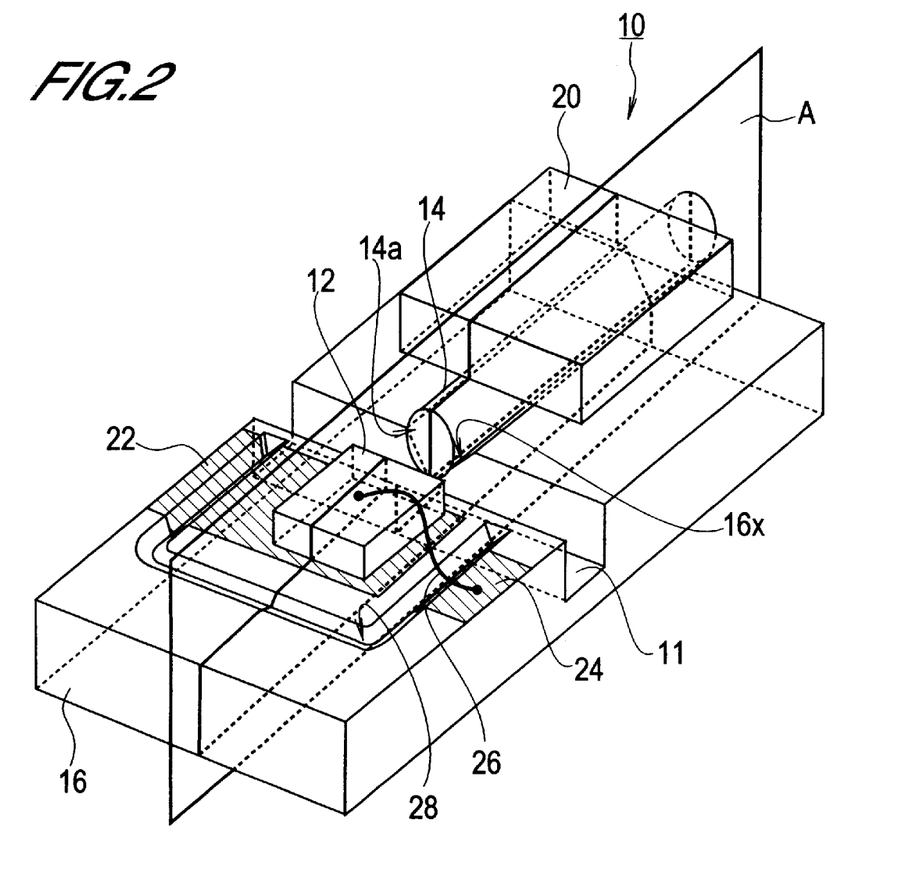
FIG. 2 is an approximate oblique view showing the composition of an optical module according to this embodiment.

FIG. 1 is a schematic compositional view showing one compositional example of an optical module according to this invention. FIG. 2 is a schematic oblique view of the same optical module as in FIG. 1. In FIG. 2, the sealing section is omitted in order to show the composition of the under side of the sealing section. FIG. 1 shows a cross-section along plane A in FIG. 2.

According to FIG. 1 and FIG. 2, this optical module 10 comprises an optical semiconductor element 12, an optical fiber 14, substrate 16 and sealing section 18. The optical semiconductor element 12 is a light-emitting LD element. The optical fiber 14 is optically coupled with the optical semiconductor element 12. The LD chip 12 and optical fiber 14 are mounted on the substrate 16. The sealing section 18 is a region covered by a sealant, comprising the LD chip 12 and a region of the optical fiber 14 containing the end face 14a of the optical fiber 14 on the LD chip side thereof.

In this embodiment, a square Si substrate having a size of 2 mm×3 mm, for example, is used as the substrate 16. A groove 11 (dicing half-cut) for registering the position of the optical fiber 14 and the LD chip 12 in the optical axis direction is formed in the upper face of the Si substrate 16. Furthermore, a V-shaped groove 16x having a width of 140 $\mu$m and a V angle of 70.5°, for example, is formed in the upper face of the Si substrate 16. The optical fiber 14 having a diameter of 125 $\mu$m, for example, is mounted in such a manner that it contacts both walls of the V-shaped groove 16x. A fiber cover 20 made from quartz glass is provided in such a fashion that it covers the optical fiber 14. The fiber cover 20 and Si substrate 16 are bonded together by means of an ultraviolet-setting adhesive (omitted from the drawings). Thereby, the optical fiber 14 is secured under pressure between the fiber cover 20 and the Si substrate 16. The optical fiber 14 is mounted in the V-shaped groove 16x in an orientation whereby the light input face 14 a thereof is directed towards the inner side of the Si substrate 16. The LD chip 12 is located at a position 20 $\mu$m distant, for example, from the light input face 14 a of the optical fiber 14 on the upper face of the Si substrate 16. Moreover, an anode electrode 22 is provided on the under side of the LD chip 12. A cathode electrode 24 is provided in a position not electrically connected with the anode electrode 22 on the upper face of the Si substrate 16 (FIG. 2). These electrodes 22 and 24 are laminated films formed by successively layering Ti film, Pt film and Au film onto the Si substrate 16. The LD chip 12 is positioned with high accuracy in such a manner that the light output from the LD chip 12 is input to the optical fiber 14, whereupon the LD chip 12 is fixed onto the anode electrode 22 by Au/Sn soldering. Moreover, the upper face of the LD chip 12 and the cathode electrode 24 are connected by means of wire bonding 26 (FIG. 2).

Furthermore, a sealant retaining section 28 is formed on the upper face of the substrate 16 in the region surrounding the optical semiconductor 12 excluding the side thereof adjacent to the optical fiber 14, in other words, on all sides thereof apart from that facing the optical fiber 14. Moreover, the sealing section 18 is constituted by a single layer of sealant material and has a dome shape. The end portion of this sealing section 18 on the sides not facing the optical fiber 14 is retained and fixed by the sealant retaining section 28 provided in the substrate 16 (FIG. 1).

In this embodiment, the sealant retaining section 28 is constituted by a groove. In the example illustrated in the drawings, this groove 28 is provided in a U shape at a position 40 μm distant, for example, from the LD chip 12, in such a manner that it surrounds the LD chip 12 in three directions from the side opposite to the optical fiber 14. Moreover, in this compositional example, a potting resin is used as the sealant. Here, an Si resin, which is a thermosetting resin, is used, and when a sealing section 18 is formed on the substrate 16 provided with the sealant retaining groove 28, the end sections of the sealing section 18 apart from the side adjacent to the optical fiber 14 bury the U-shaped groove 28 and are retained by same, thereby yielding a sealing section 18 which is raised in a dome shape. Furthermore, the groove 11 is also buried by the sealing section 18. Consequently, to the extent that no loosening of the potting resin occurs during formation of the sealing section 18, it is possible to form a sealing section 18 of a thickness whereby the LD chip 12 and the optical coupling section 30 between the LD chip 12 and the optical fiber 14 can be covered over sufficiently by means of a single coating of sealant (FIG. 1).

Therefore, since there is no risk of the LD chip 12 or the region surrounding the optical coupling section 30 being exposed to the external atmosphere, it is possible to ensure the reliability of the optical module 10.

Next, a method for manufacturing an optical module 10 according to this embodiment is described.

Figure 3:
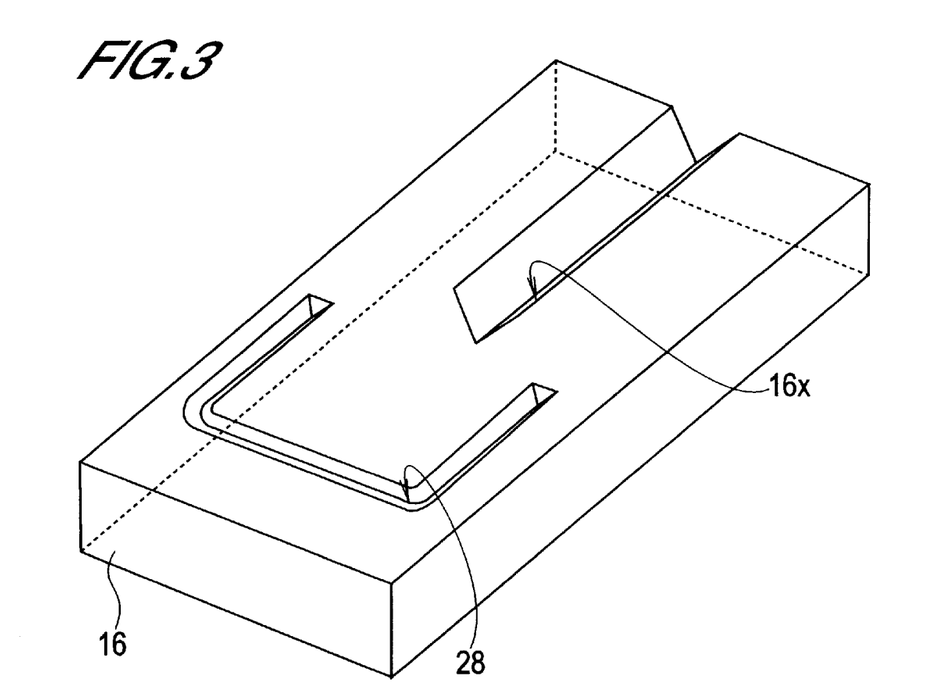
FIG. 3 is a manufacturing process diagram of an optical module according to this embodiment.
Figure 4:
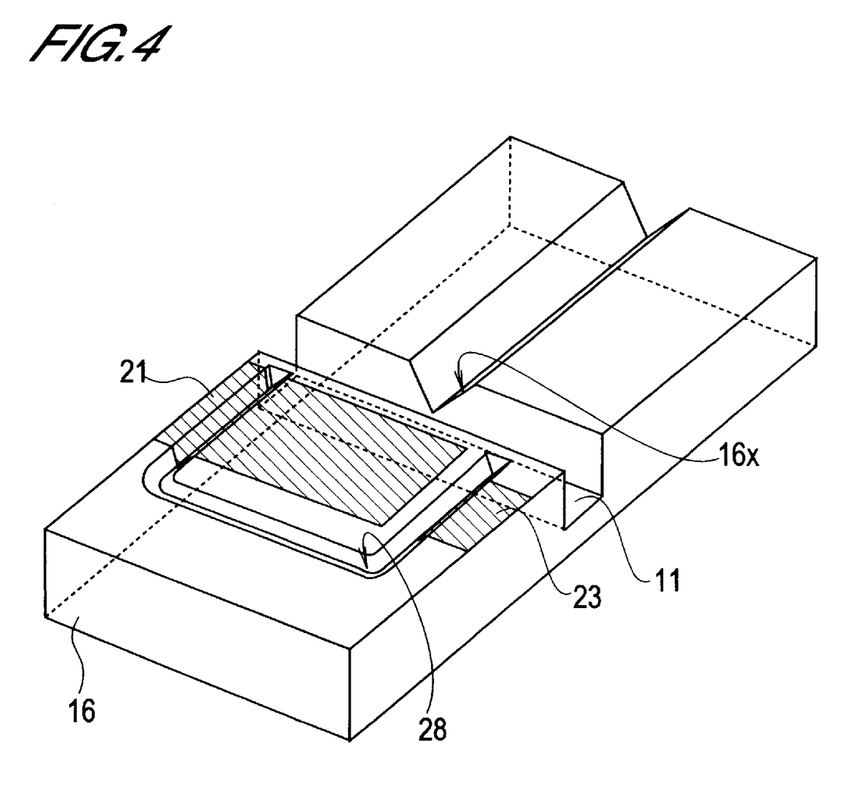
FIG. 4 is a manufacturing process diagram of an optical module according to this embodiment, following from FIG. 3.

Since the basic manufacturing steps do not differ from the method described in the section relating to the prior art above, a detailed description of points which are similar to the prior art is omitted here. FIG. 3 and FIG. 4 are general manufacturing procedure diagrams for an optical module according to this embodiment.

Firstly, a Si substrate 16 having a size of 2 mm vertical by 3 mm horizontal is prepared as described above. A V-shaped groove 16x is formed by etching onto the region of this Si substrate 16 where the optical fiber is to be positioned. In this embodiment, a sealant retaining groove 28 is formed about the periphery of the region where the optical semiconductor element 12 is to be mounted, at the same time as forming the V-shaped groove 16x.

Here, a wet etching technique using hydrous KOH (potassium hydroxide) is employed for the aforementioned etching process. Thereby, a V-shaped groove 16x of approximately 140 μm width and a sealant retaining groove 28 of 50 μm width are formed. Similarly to the V-shaped groove 16x for affixing the optical fiber, the sealant retaining groove 28 is a groove having a V shape based on the crystalline isotropy of the Si substrate 16. Furthermore, the sealant retaining groove 28 is formed in a U shape surrounding the region where the LD chip is expected to be formed at a distance of 40 μm therefrom, with the exception of the side adjacent to the optical fiber (FIG. 3).

Next, a laminated film is formed by layering a Ti film, Pt film and Au film successively by means of a sputtering process. Thereupon, by means of photolithography and subsequent etching processes, this laminated film is respectively patterned to form an anode electrode-shaped pattern 21 and a cathode electrode-shaped pattern 23 (see FIG. 4).

Next, a groove (dicing half-cut) 11 for positioning the optical fiber and the optical semiconductor element in the optical axis direction is formed in the upper face of the Si substrate 16 (FIG. 4).

Thereupon, an LD chip 12 is positioned on the anode electrode-shaped pattern 21 by means of a marker alignment process, and then fixed in position by means of Au/Sn solder. Next, the upper face of the LD chip 12 and the cathode electrode-shaped pattern 23 are connected by wire bonding 26. Thereby, the anode electrode-shaped pattern 21 forms an anode electrode 22, and the cathode electrode-shaped pattern 23 forms a cathode electrode 24 (see FIG. 2).

Next, similarly to the prior art, an optical fiber 14 is mounted in the V-shaped groove 16x, whilst positioning same in the optical axis direction with respect to the LD chip 12, by means of the dicing half-cut 11. Thereupon, a quartz glass fiber cover 20 is provided in such a manner that it covers the optical fiber 14. The fiber cover 20 and Si substrate 16 are then bonded by means of an ultraviolet-setting adhesive (see FIG. 2).

Next, several grams of an Si resin, which is a potting resin, is applied thereon in such a manner that it covers all of the LD chip 12 and the portion of the optical fiber 14 at the light input face 14 a side thereof. The assembly is then heated for 2 hours in an oven at a temperature of 130–150° C. During this heat treatment, the viscosity of the resin temporarily falls below that immediately after coating, and hence the resin flows over the upper face of the substrate 16. When the front edges of this resin in the direction of flow thereof reach the sealant retaining section 28, the resin enters into the groove 28. Thereby, the resin is restricted from spreading further over the upper face of the substrate 16. Moreover, whilst the resin is entering into the groove 28, the viscosity of the resin increases, and the whole of the LD chip 12 and the periphery of the optical coupling section 30 between the LD chip 12 and the optical fiber 14 become covered by the resin (FIG. 1).

Consequently, it is possible to form a sealing section 18 using substantially the whole amount of the resin coated thereon, without the occurrence of any loosening. The sealing section 18 forms a dome shape, and is capable of covering the LD chip 12 and the optical coupling section 30 between the LD chip 12 and the optical fiber 14 sufficiently, by means of a single layer of Si resin. Accordingly, there is no risk of the LD chip 12 or the optical coupling section 30 being exposed to the external atmosphere, and hence the reliability of the optical module 10 can be ensured.

Thereby, it is possible to form an optical module having high reliability, readily, by means of a single coating and heat treatment procedure for potting resin, rather than having to perform repeated coating and heat treatment procedures for same.

Figure 5:
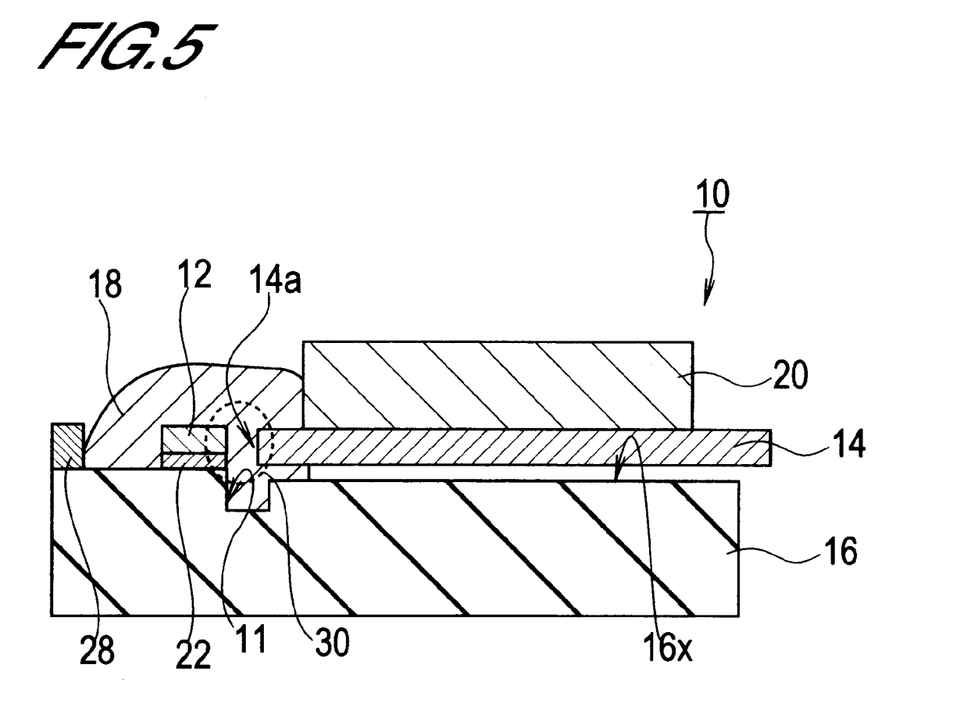
FIG. 5 is a schematic diagram showing a further compositional example of an optical module according to this embodiment.

Moreover, this embodiment related to an example where the sealant retaining section 28 was formed as a groove, but it is also possible to constitute a sealant retaining section by means of a wall. A schematic illustration of a composition wherein a wall is provided in place of the sealant retaining groove 28 in the compositional example described above is given in FIG. 5. When a wall 28 is provided, it is also possible to form a dome-shaped sealing section 18 having a single-layer structure in order to retain the sealant flowing during the coating and heat treatment processes, in a highly effective manner (FIG. 5).

Furthermore, in this embodiment, an LD chip which is a light-emitting element was used as the optical semiconductor element 12, but the invention is not limited to this. For example, it is also possible to use a PD, which is a light-receiving element. In this case, the PD and optical fiber should be positioned on the upper face of the substrate in such a manner that the light receiving face of the PD faces the light output end face of the optical fiber. Further compositions may be formed in a similar manner to this embodiment. Moreover, it is also possible to apply the present invention to an optical module having a composition wherein two or more optical semiconductor elements are provided on the upper face of a substrate. In this case, a groove or wall forming a sealant retaining section should be formed about the respective optical semiconductor elements.

Furthermore, the plan view configuration of the aforementioned groove or walls 28 as viewed from above the optical module is not limited to a U shape as described above, but rather, a further appropriate shape, such as a C shape or other curved line shape, may also be adopted.

What is claimed is:

1. An optical module comprising: an optical semiconductor element; an optical fiber coupled optically with said optical semiconductor element; a substrate whereon said optical semiconductor element and said optical fiber are mounted; and a sealing section wherein said optical semiconductor element and a portion of said optical fiber containing the end face thereof adjacent to said optical semiconductor element are covered by a sealant;

wherein a sealant retaining section is formed on the upper face of said substrate in the region about the periphery of said optical semiconductor element with the exception of the side thereof adjacent to said optical fiber;

said sealing section having a dome shape constituted by a single layer of sealant; and the end portions of said sealing section with the exception of the side adjacent to said optical fiber being fixed by said sealant retaining section.

2. An optical module according to claim 1, wherein said sealant retaining section is a groove.

3. An optical module according to claim 1, wherein said sealant retaining section is a wall.

4. A method for manufacturing an optical module comprising the steps of: forming a V-shaped groove in a region of a substrate where an optical fiber is to be mounted, by means of an etching process; mounting and then fixing an optical semiconductor element and optical fiber onto said substrate; and forming a sealing section;

wherein a sealant retaining groove is formed about the periphery of the region of said substrate where said optical semiconductor element is mounted, at the same time as the step of forming said V-shaped groove; and said step of forming a sealing section involves applying a sealant over said substrate and then performing heat treatment, the front edges of said sealant in the direction in which same flows across the upper face of said substrate being retained by said sealant retaining groove, and forming, in a substantially simultaneous manner, a dome-shaped sealing section covering said optical semiconductor element and a portion of said optical fiber containing the end face thereof adjacent to the optical semiconductor element.

* * * * *

UNITED STATES PATENT AND TRADEMARK OFFICE
CERTIFICATE OF CORRECTION

PATENT NO. : 6,328,485 B1
DATED : December 11, 2001
INVENTOR(S) : Hajime Hotta

It is certified that error appears in the above-identified patent and that said Letters Patent is hereby corrected as shown below:

Title page,
Under Foreign Application Priority Data, please delete "12-176271" and replace with -- 2000-176271 --.

Signed and Sealed this

Nineteenth Day of March, 2002

Attest:

JAMES E. ROGAN
Attesting Officer
Director of the United States Patent and Trademark Office